US006761847B2

(12) United States Patent
Meggiolan

(10) Patent No.: US 6,761,847 B2
(45) Date of Patent: Jul. 13, 2004

(54) METHOD FOR PRODUCING A BICYCLE WHEEL RIM

(75) Inventor: Mario Meggiolan, Vicenza (IT)

(73) Assignee: Campagnolo Srl, Vicenza (IT)

( * ) Notice: Subject to any disclaimer, the term of this patent is extended or adjusted under 35 U.S.C. 154(b) by 0 days.

(21) Appl. No.: 10/073,411

(22) Filed: Feb. 13, 2002

(65) Prior Publication Data

US 2002/0108249 A1 Aug. 15, 2002

(30) Foreign Application Priority Data

Feb. 13, 2001 (IT) .................................... TO2001A0121

(51) Int. Cl.[7] ................................................ B29C 70/44
(52) U.S. Cl. ...................... 264/257; 264/258; 264/314; 264/317; 264/324
(58) Field of Search .......................... 264/40.1–40.4, 264/411, 257, 258, 313, 314, 317

(56) References Cited

U.S. PATENT DOCUMENTS

| 4,983,430 | A | * | 1/1991 | Sargent | ...................... | 428/34.1 |
| 5,540,485 | A | * | 7/1996 | Enders | ........................ | 301/104 |
| 5,975,645 | A | * | 11/1999 | Sargent | ........................ | 301/95 |
| 6,283,557 | B1 | * | 9/2001 | Okajima et al. | ............... | 301/97 |
| 6,347,839 | B1 | * | 2/2002 | Lew et al. | ..................... | 301/95 |

* cited by examiner

Primary Examiner—Stefan Staicovici
(74) Attorney, Agent, or Firm—Volpe & Koenig, P.C.

(57) ABSTRACT

A method for producing a bicycle wheel rim having an inner peripheral wall, an outer peripheral wall, two lateral walls joining said peripheral walls, and two circumferential wings, for anchoring a tire, is provided. The method providing a rim made of a single part made of structural fiber based material, preferably carbon fiber material.

74 Claims, 7 Drawing Sheets

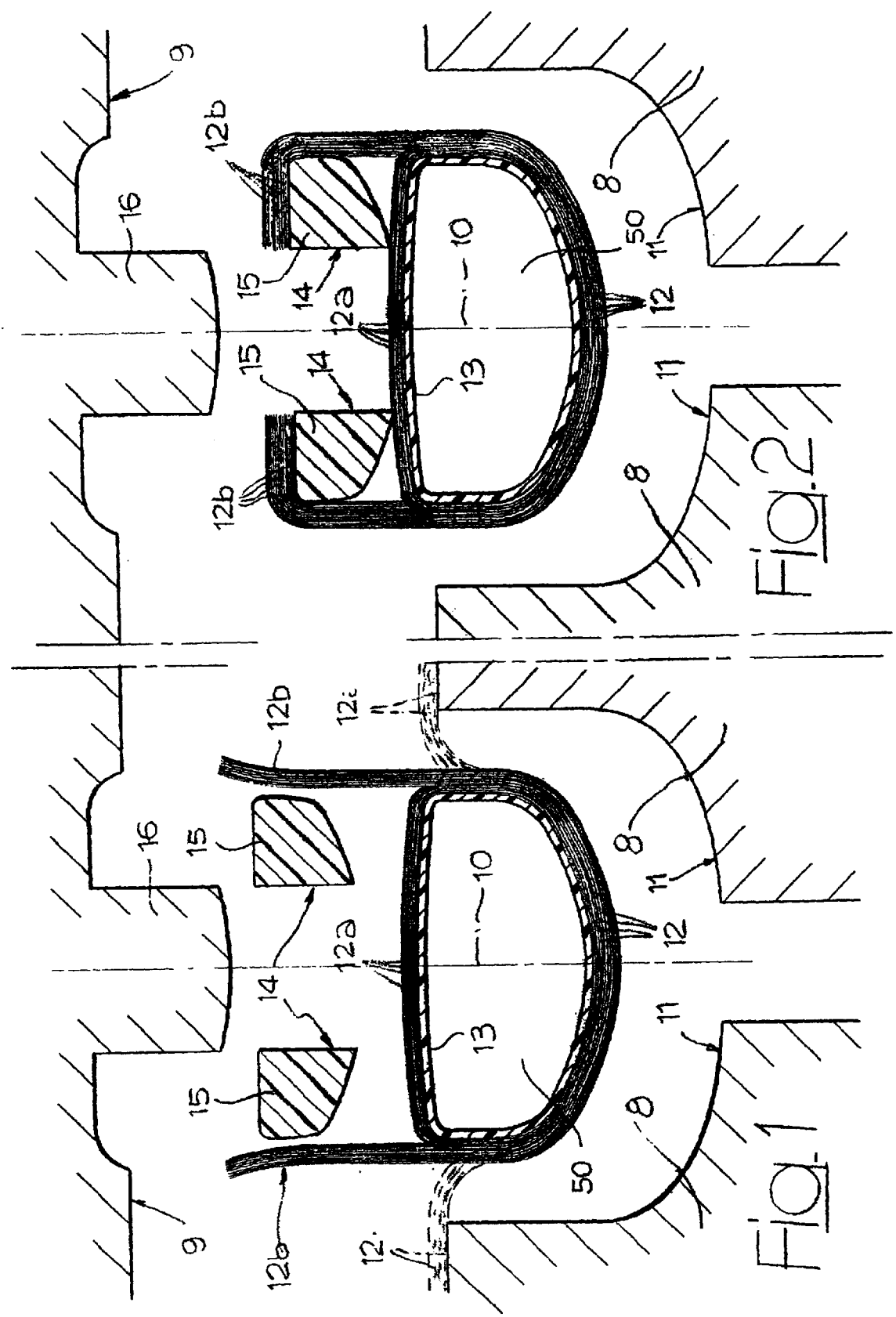

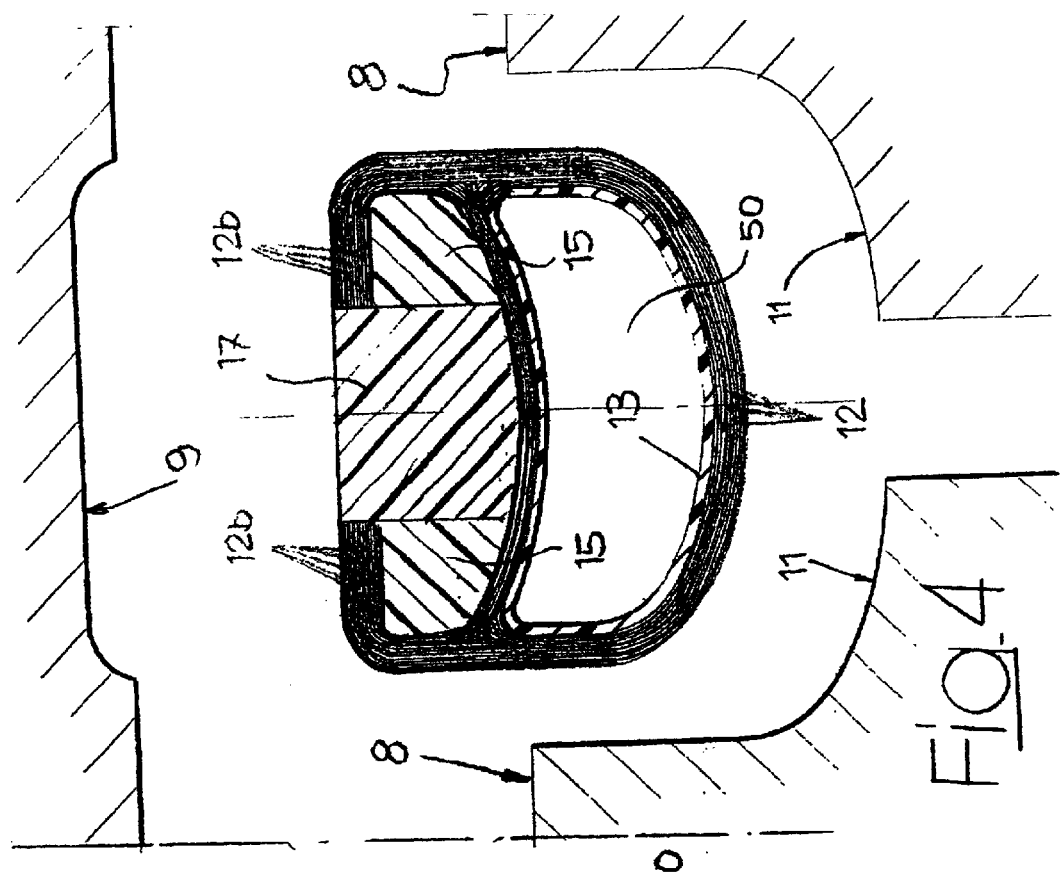
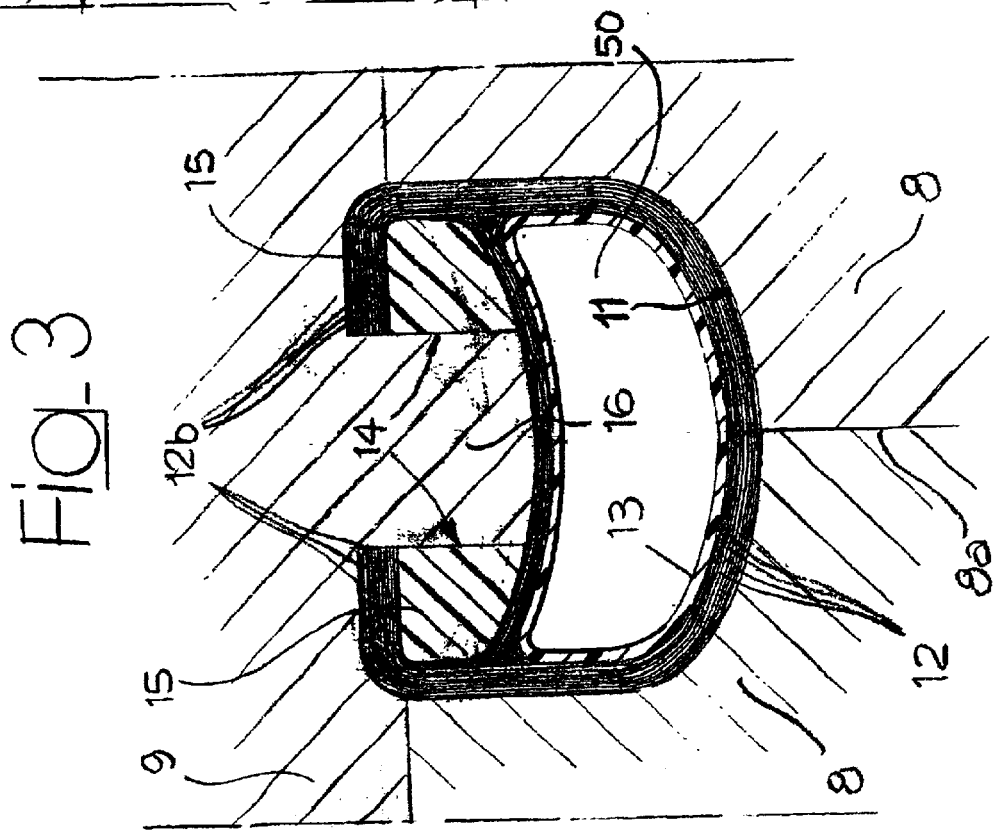

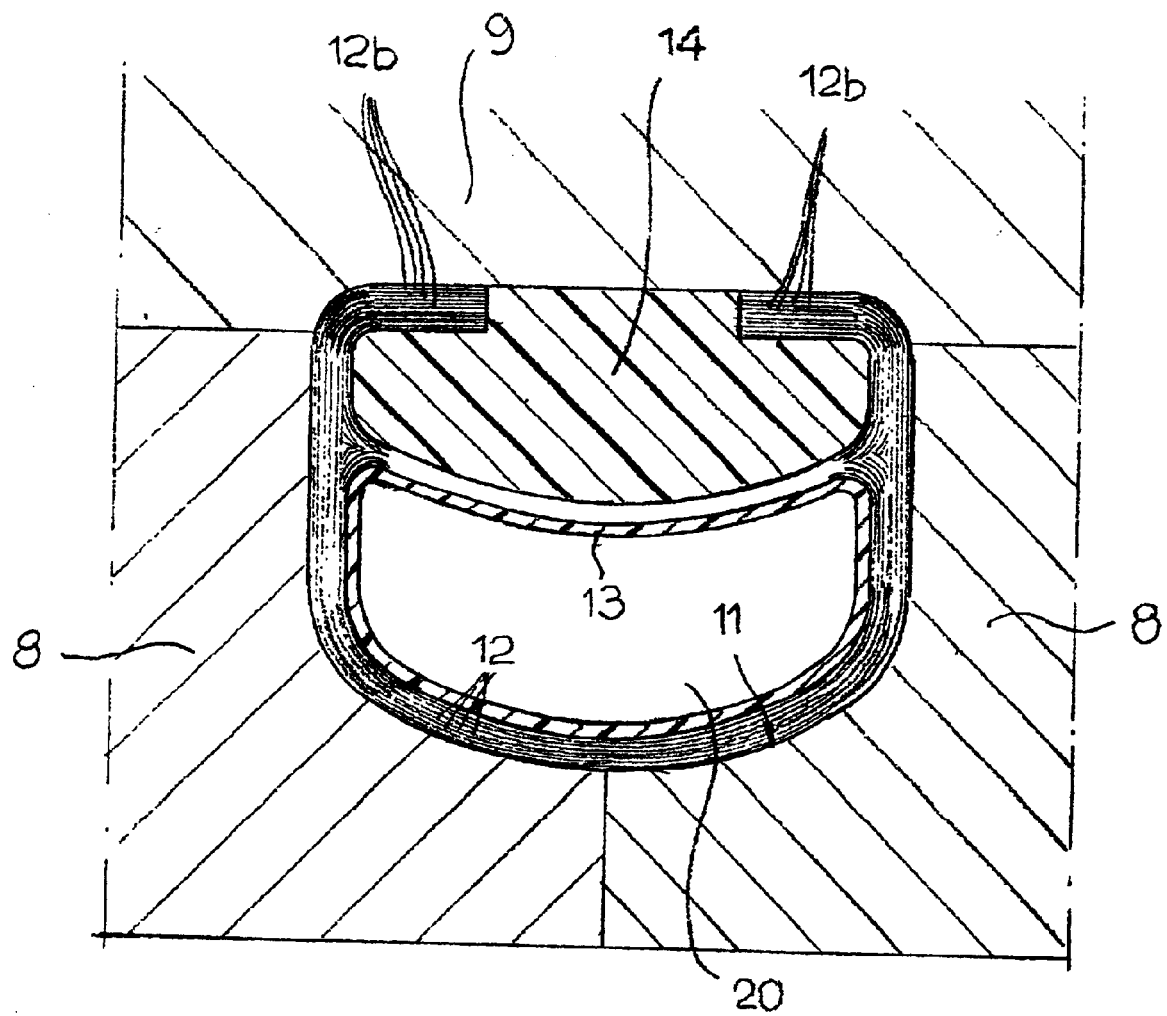

Fig_9
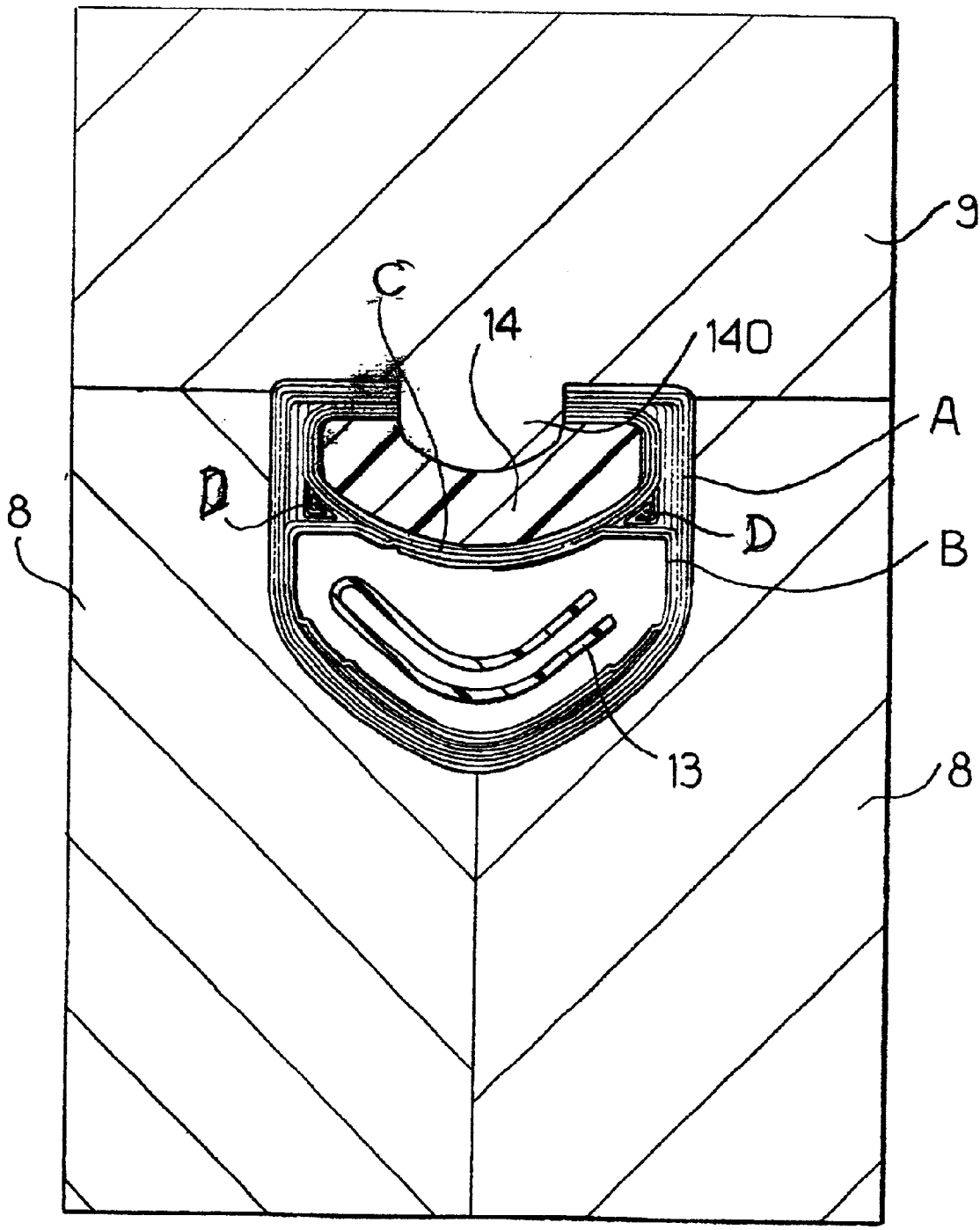

Fig_10
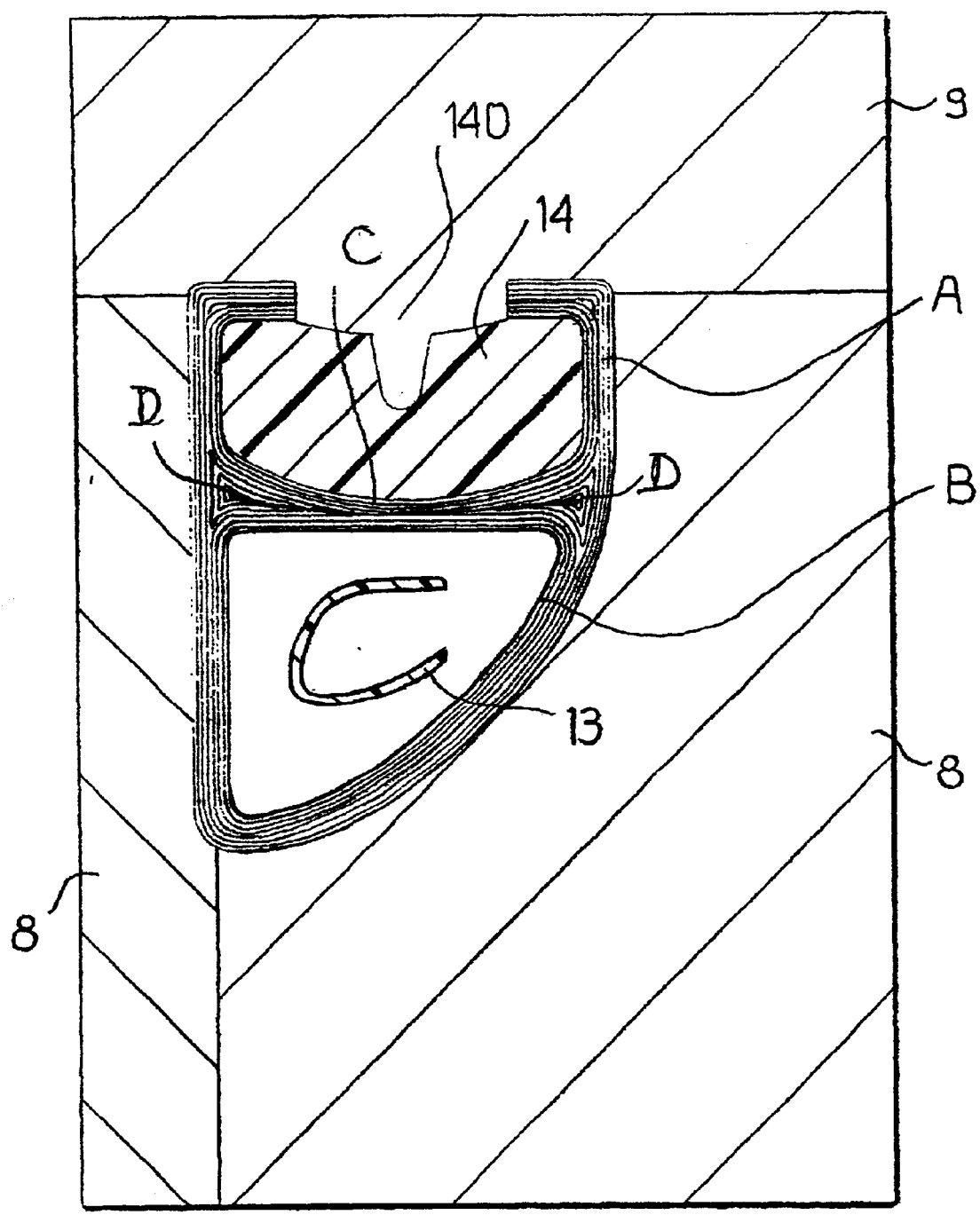

METHOD FOR PRODUCING A BICYCLE WHEEL RIM

BACKGROUND OF THE INVENTION

This invention relates to bicycle wheel rims of the type presenting a peripheral inner wall, a peripheral outer wall, two lateral walls joining said peripheral walls and two circumferential wings for anchoring a tyre which radially extend outwards from the two sides of the outer peripheral wall.

This invention also relates to a method for producing a rim of the type described above.

The Applicant has recently conducted various studies and tests to make bicycle wheel rims using structural fibre based material, typically carbon fibre based material. The advantage offered by this type of material is that of being light in weight with respect to the metallic materials used in the past given equal structural characteristics. Making a rim out of a single part of carbon fibre based material was difficult, at least utilising the technologies available at that time, due to the typical conformation of the circumferential anchoring wings of the tyre. Typically, these wings present peripheral outer edges folded one towards the other thus creating an undercut, which causes the moulding problems.

SUMMARY OF THE INVENTION

The object of this invention is to overcome this technical problem.

In order to attain this object, this invention relates to a rim for a bicycle wheel, comprising an inner peripheral wall, an outer peripheral wall, two lateral walls joining said peripheral walls, and two circumferential wings for anchoring a tyre which radially extend outwards from the two sides of the outer peripheral wall, wherein said rim is made of a single part of structural fibre based material incorporating the two circumferential wings.

This invention relates also to a method for producing a bicycle wheel rim of the type presenting an inner peripheral wall, an outer peripheral wall, two lateral walls joining said peripheral walls, and two circumferential wings, for anchoring a tyre, which extend outwards from the two sides of the outer peripheral wall, wherein it comprises the following steps:

applying on the inner part of a mould a predetermined number of layers of structural fibre fabric incorporated in a plastic material matrix which are to form the inner wall, the outer wall, the two lateral walls and the wings;

arranging an inflatable bag on the layers;

folding a first predetermined number of the layers on the inflatable bag;

applying at least one core over the folded first predetermined number of layers;

folding a second predetermined number of the layers over the core;

applying the outer part of the mould so as to enclose the layers;

inflating the inflatable bag so as to press the layers against the mould;

increasing the temperature of the mould to a value sufficient to cause reticulation of the plastic material matrix;

removing the bicycle wheel rim from the mould and removing the core, so as to obtain a bicycle wheel rim formed of a single piece of structural fibre material.

The cores are made of a material with a thermal dilation coefficient exceeding $5\times10^{-5}$ mm/° C., the moulding process comprising an increase in temperature to a value sufficient to cause the material of said cores to dilate so as to press the layers of fabric forming the tyre anchoring wings against the wall of the mould.

Preferably, the material forming the cores has a thermal dilation coefficient exceeding $9\times10^{-5}$ mm/° C. and a maximum continuous thermal resistance temperature exceeding 100° C.

Again preferably, the material forming the core can be either PTFE (polytetrafluoroethene), or FEP (fluorinated ethene propene), or PCTFE (polychlorotrifluoroethene), or PVDF (polyfluorodivinylidene), or PE-HD (high density polyethylene).

The use of PTFE is widely preferred, due to the anti-adherence properties of this material, which are useful for detaching the core, or cores, from the structural fibre moulded body, as well as its high continuous thermal resistance (260° C.), for its good thermal conductivity (0.25W/m° C.) and for its good thermal capacity (specific heat), equal to 1.045 Kj/kg° C.

This material presents the characteristic of being subject to high thermal dilation at relatively low temperatures, in the order of temperatures at which the plastic material in which the structural fibre fabric is incorporated reticulates.

Structural fibre fabrics incorporated in a plastic material matrix are known and have been used for some time. They are made with yarn obtained from structural fibres, such as carbon fibres, for example. These fabrics are then subjected to an impregnation method to associate them with a plastic material matrix, typically a thermosetting plastic material.

According to an additional preferred embodiment of this invention, two ring-shaped cores of said thermally dilating material are used, each split into several sectors if required, which are arranged so as to be spaced from each other around the layers which are to form the peripheral external wall of the rim, each core supporting one of the two tyre anchoring wings.

In a first embodiment, the space comprised between said two rings is filled by one wall of the mould. In a second form of embodiment, this space is filled by a third core, which is also a ring formed by several sectors, made of thermally dilating material. The cores being split into several sectors allows easy removal of said cores from the part obtained at the end of the moulding process, after opening the mould, despite the undercut conformation of the two tyre anchoring wings. In a third embodiment, the core is a silicone sheath made in a single continuous piece or in sectors centered by a projection of the outer mould.

As shown above, the application of the required pressure inside the mould on the layers destined to form the outer and inner peripheral walls of the rim, as well as the two lateral walls of the rim, is obtained by arranging an inflatable bag in the cavity between these layers. The bag can remain inside the part after the end of the moulding process. This technique was previously tested by the Applicant for making rims of the type above without tyre anchoring wings. This technique cannot be used in a similar fashion for making said anchoring wings in rims of the type comprising said wings. For this reason, the Applicant has additionally developed studies to create this invention.

According to an additional preferred characteristic of this invention, the rim can initially be moulded with anchoring wings which are longer than required. In this case, after the moulding process, mechanical machining is carried out to reduce the wings to the required dimensions. This method also has the advantage of preventing superficial defects, which may be present on the circumferential edges of the two wings at the end of the moulding process. This method is an invention in its own right, regardless of the type of moulding process used.

Further features of the method of the invention are indicated in the claims.

The invention is also directed to the apparatus for carrying out the above described method as well as to the bicycle wheel rim per se. The features of the apparatus and the rim of the invention are also set forth in the appended claims.

BRIEF DESCRIPTION OF THE DRAWINGS

This invention will be better explained by the following detailed descriptions with reference to the accompanying figures as non-limiting examples, whereas:

FIGS. 1, 2 and 3 illustrate three different phases of a moulding method of a bicycle rim according to this invention, FIGS. 4, 5 illustrate two different phases of the method according to this invention, with the use of a modified mould with respect to the one shown in FIGS. 1–3, FIG. 8 is a variant of FIG. 5, and FIGS. 9, 10 show two further variants.

DETAILED DESCRIPTION OF THE INVENTION

Figure 6:
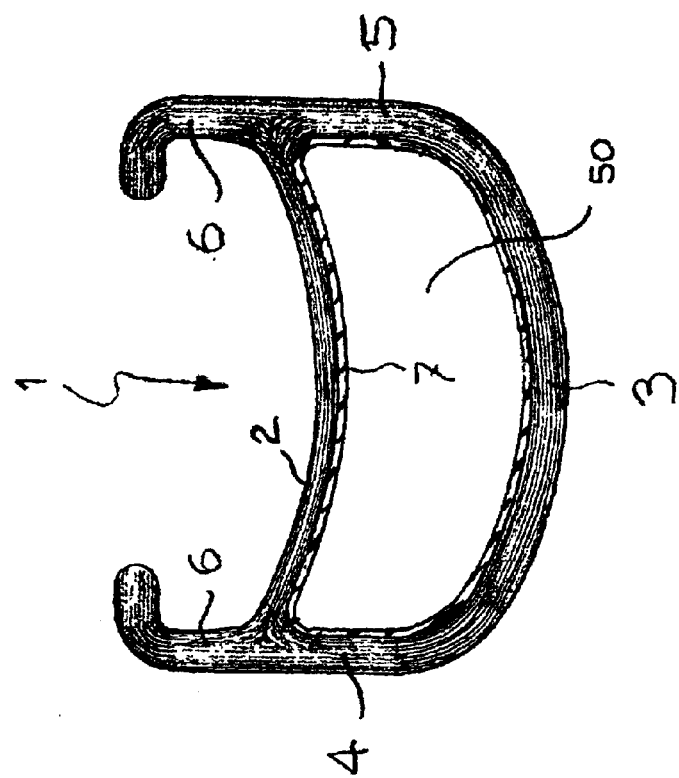
FIG. 6 illustrates the end product, which can be obtained either with the mould in FIGS. 1–3 or with the mould of FIGS. 4, 5, after final mechanical machining required to reduce the tyre anchoring wings to the required dimensions.

With reference to FIG. 6, the method according to this invention is used to make a rim 1 for a bicycle wheel, which cross section is shown in the figure. The rim comprises an outer peripheral wall 2, an inner peripheral wall 3, two lateral walls 4, 5, joining the peripheral walls 2, 3 and defining a closed circumferential cavity 50 with the peripheral walls 2, 3, and two circumferential wings 6 for anchoring a tyre, which extend radially outwards towards the sides of the outer peripheral wall 2. As mentioned above, the rim 1 made with the method according to this invention presents a body made of a single part made of structural fibre based material, preferably carbon fibre material. A plastic material bag 7 is arranged inside the cavity 50, for the reasons illustrated below.

FIGS. 1–3 show three subsequent phases of the method according to this invention, with the use of a first type of mould. In this case, the mould used for moulding the rim comprises two inner elements 8 and an outer element 9. The inner elements 8 are circumferential elements which overlap on a plane 8a. They define a circumferential surface 11 destined to delimit, as shown in FIG. 3, the outer surface of the inner peripheral wall and the two sides of the rim. In order to form the rim, a number of layers 12 of the structural fibre based fabric, for example carbon fibre fabric, incorporated in a plastic material matrix, are arranged on the surface 11, but the structural fibres can be selected among carbon fibres, glass fibres, aramidic fibres, boron fibres, ceramic fibres or any combinations thereof. The arranged layers 12 are destined to assume the conformation shown in FIG. 1. Firstly, the layers 12 are arranged on the surface 11 so to present sections 12 radially extending outwards from the mould elements 8, which are arranged in the position illustrated with the dotted line. An inflatable bag made of plastic material 13 is then arranged on the layers. The bag is equipped with an inflating valve (not shown), which communicates externally to the mould by means of a passage (not shown in the figures). The purpose of the inflatable bag 13 is to press the layers of fabric 12 against the walls of the mould during the moulding process while the mould is closed. Again with reference to FIG. 1, after positioning the plastic material bag 13, a certain number 12a of the projecting sections of the layers of fabric 12 are partially folded back, over the bag 13 and another number 12b is left free to form edges destined to make the circumferential tyre anchoring wings 6. Naturally, additional layers C can be applied on the layers 12 positioned over the bag 13, to achieve any required thickness of the external peripheral wall 2 of the rim, and/or of wings 6. Further, additional layers D can also be applied to fill the side regions of the outer wall of the rim.

Figure 7:
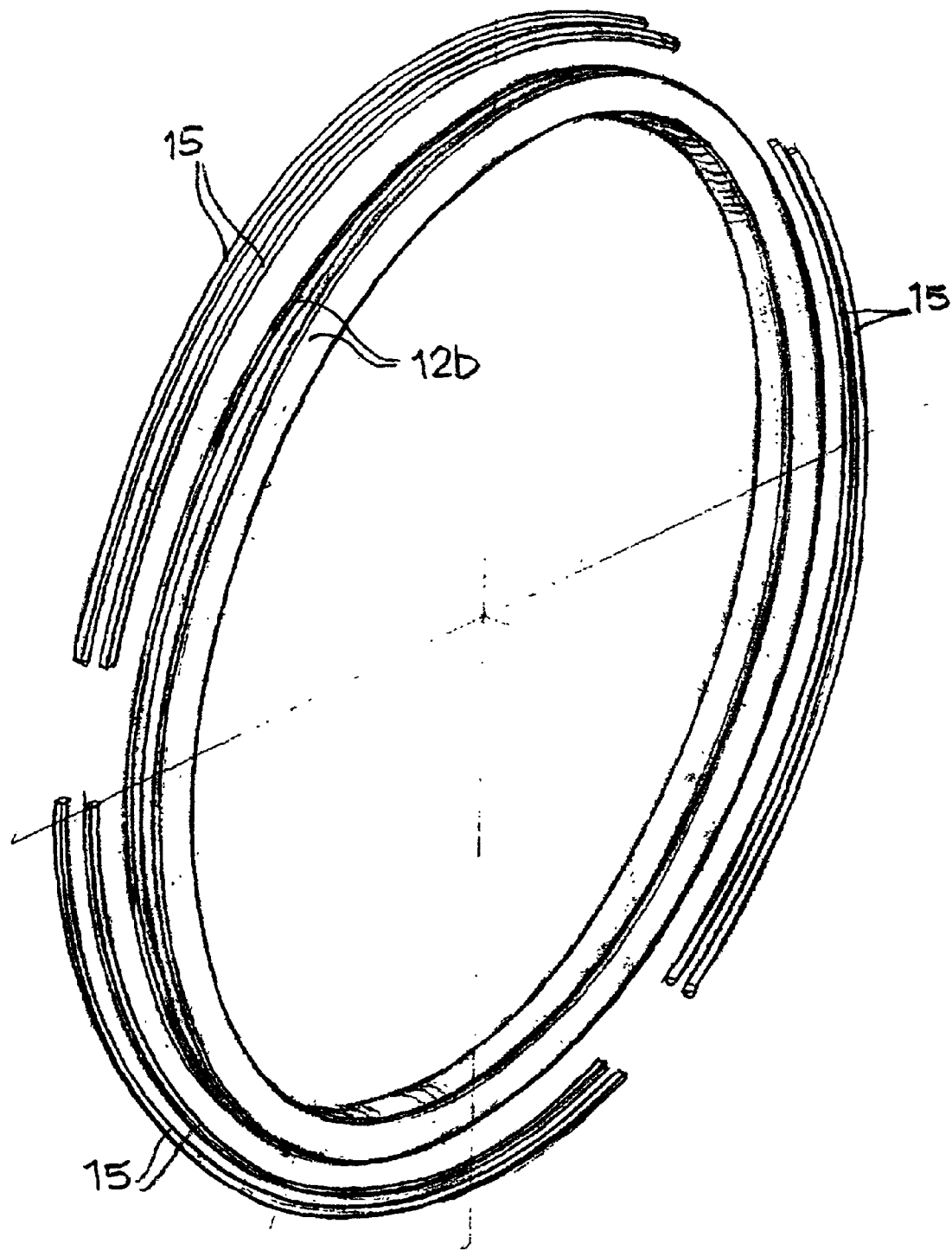
FIG. 7 illustrates a perspective exploded view of a phase of the method.

Again with reference to FIG. 1 and also to FIG. 7, two cores 14, each made of a ring which may be split into several sections (for example into three sections) 15, to facilitate the subsequent extraction of the cores 14 from the mould, are arranged over the layers 12 destined to form the outer peripheral wall 2 of the rim. The two rings 15 are arranged over the layers 12, destined to form the wall 2, in a reciprocally distanced position, so to allow folding one of the edges 12b on it in order to make the tyre anchoring wings 6 (see FIG. 2). In the form of embodiment shown in FIGS. 1–3, the space between the two rings 14 is filled by a circumferential ribbing 16 of the outer element 9 of the mould, as shown in FIGS. 2, 3 (the latter figure shows the mould in the closed condition with the bag inflated).

As extensively described above, the material forming the cores 14 is a material presenting a relatively high thermal dilation coefficient, such as PTFE, for example. The mould is thus closed with the layers 12 arranged inside, placed in an oven and subjected to a heating and cooling cycle so to cause the reticulation of the plastic material matrix in which the carbon fibre fabrics are incorporated, on one hand, and the thermal dilation of the cores 14, on the other hand, to press the layers of fabric 12b against the walls of the mould. The pressure required to make the outer and inner peripheral walls and the sides of the rim is ensured by letting pressurised air into the inflatable bag 13. The temperature to which the mould must be taken in order to complete the process is preferably comprised in the range from 80° C. to 200° C. The mould is preferably maintained at a temperature in this range for a time comprised in the range from 10 minutes to three hours, preferably from 30 minutes to three hours.

After the moulding process, a cooling phase follows, then the mould is opened and the cores 14 are removed.

It is important to note that any number, conformation and arrangement of cores used for moulding the wings 6 can be used, also entirely different from the cores illustrated in the drawings provided as non-limiting examples. The case of a single core made of deformable material may also be envisaged to allow extraction from the mould (FIG. 8). FIG. 9 shows a further variant in which a single core 14 is provided in form of a silicone sheath made in a single continuous piece or in sectors. This sheath is deformable and kept in a centered position by a projection 140 of the outer mould. At the end of the process the silicone sheath is extracted with the aid of pliers According to an additional important characteristic of the invention, the edges 12b of the layers destined to form the wings 6 are arranged to form a length exceeding the required dimensions. Consequently, at the end of the moulding process, the parts are mechanically machined to reduce the wings 6 to the required length and/or shape. The method also has the advantage of eliminating any surface defects which may be present on the ends of the edges 12b at the end of the moulding process in the mould. This characteristic can be used regardless of the moulding process used, and is consequently an invention in its own right.

Figure 5:
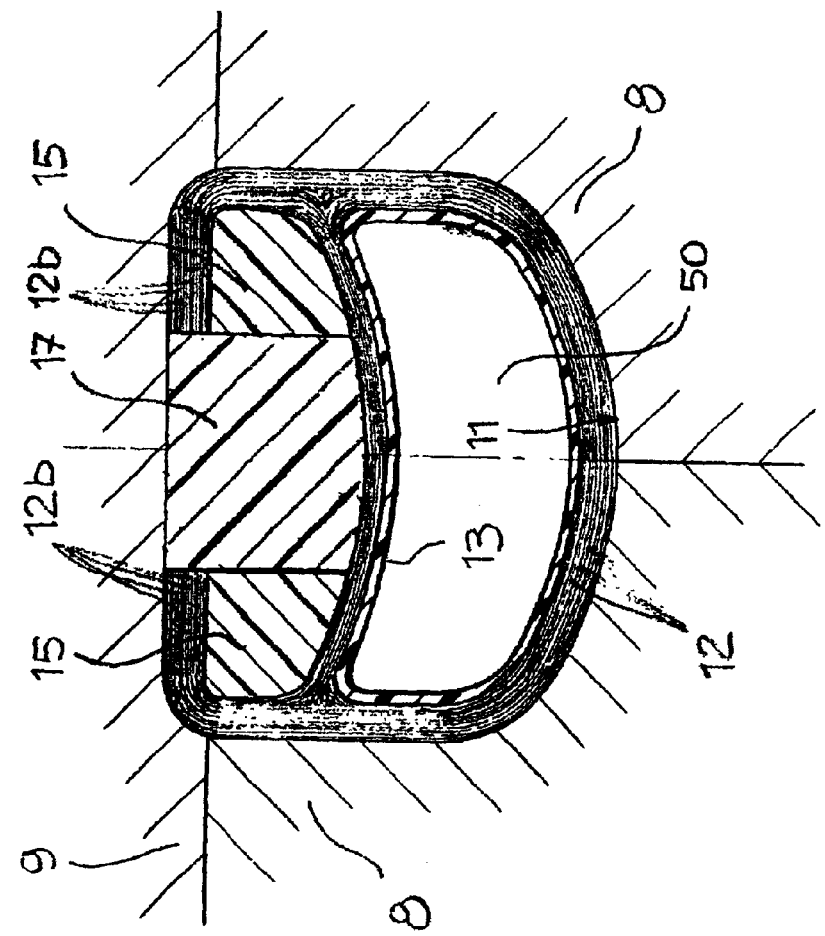

FIGS. 4, 5 illustrate a second type of mould in the open condition and in the closed condition. In this case, the space comprised between the two ring-shaped cores 14 is occupied by a third ring-shaped core 17, also made of high thermal dilating material, for example PTFE.

Finally, FIG. 10 shows the case of a rim with asymmetrical cross-section obtained according to the principles of the present invention. In this case the layers of fibre fabric material include first layers A extending so as to contribute to define the inner wall, the side walls and the two wings of the rim, second layers B arranged so as to contribute to define the inner, side and outer walls of the rim, third layers C arranged to define the outer wall and the two wings of the rim, and fourth layers D wound to fill the side regions of the outer wall of the rim from which the wings depart.

Naturally, numerous changes can be implemented to the construction and forms of embodiment of the invention herein envisaged, all comprised within the context of the concept characterising this invention, as defined by the following claims.

What is claimed is:

1. A method for producing a bicycle wheel rim of the type presenting an inner peripheral wall, an outer peripheral wall, two lateral walls joining said peripheral walls, and two circumferential wings, for anchoring a tyre, which extend outwards from the two sides of the outer peripheral wall, wherein said method comprises the following steps:
   a. applying on an inner part of a mould a predetermined number of layers of structural fibre fabric incorporated in a plastic material matrix sufficient to form an inner wall, an outer wall, two lateral walls and wings;
   b. arranging an inflatable bag on the layers between the lateral walls;
   c. folding a first selected number of the predetermined layers on the inflatable bag, leasing the remaining predetermined number of layers free;
   d. applying a core over the folded layers;
   e. folding the remaining predetermined number of the layers over the core;
   f. applying an outer part of the mould to enclose the layers;
   g. inflating the inflatable bag to press the layers against the mould;
   h. increasing the temperature of the mould to a value sufficient to cause reticulation of the plastic material matrix; and
   i. removing the core from the product of step h, to obtain a bicycle wheel rim formed of a single piece of structural fibre material.

2. Method according to claim 1, wherein also said core applies pressure to said layers.

3. Method according to claim 1, wherein the increase of temperature and application of pressure to the layers occur substantially simultaneously.

4. Method according to claim 1, wherein a cooling phase is provided before removal of the rim from the mould.

5. Method according to claim 1, wherein said core is made of a material with a thermal dilation coefficient exceeding 5×10 mm/° C., the moulding process comprising an increase in temperature to a value sufficient to cause the material of said core to dilate so to press the layers of fabric forming the tyre anchoring wings against the wall of the mould.

6. Method according to claim 5, wherein the material forming the core has a thermal dilation coefficient exceeding 9×10 mm/0C.

7. Method according to claim 6, wherein the material forming the core is either PTFE, or PCFTE, or PVDF, or PE-HD.

8. Method according to claim 6, wherein the material forming the core is PTFE.

9. Method according to claim 1, wherein said structural fibres are carbon fibres.

10. Method according to claim 1, wherein said plastic material is a thermosetting plastic material matrix.

11. Method according to claim 1, wherein said temperature is comprised in the range from 80° C. to 200° C.

12. Method according to claim 11, wherein said temperature is maintained for a time comprised in the range from 10 minutes to 3 hours.

13. Method according to claim 12, wherein said temperature is maintained for a time comprised in the range from 30 minutes to 3 hours.

14. Method according to claim 1, wherein the core comprises two ring-shaped cores, which are arranged so as to be spaced from each other.

15. Method according to claim 14, wherein each ring-shaped core is made in a single piece of deformable material.

16. Method according to claim 14, wherein each ring-shaped core is split into several sectors.

17. Method according to claim 14, wherein the space between said ring-shaped cores is filled by a circumferential rib belonging to the mould.

18. Method according to claim 14, wherein a third ring-shaped core, also made of thermally dilating material, is arranged between said two rings.

19. Method according to claim 18, wherein said third ring-shaped core is made in a single piece of deformable material.

20. Method according to claim 18, wherein said third ring-shaped core is split into several sectors.

21. Method according to claim 1, wherein the core is made by a single ring-shaped member of deformable dilating material.

22. Method according to claim 21, wherein the core is made of a silicone sheath.

23. Method according to claim 22, wherein the silicone sheath is divided in sectors.

24. Method according to claim 23, wherein the single ring-shaped core has an outwardly facing recess for engagement of a centering projection of the mould.

25. Method according to claim 24, wherein the centering projection is provided on an outer portion of the mould.

26. Method according to claim 1, wherein the mould comprises two inner circumferential elements arranged side by side, on which the layers for forming the inner peripheral wall and the two lateral walls of the rim are deposited, said mould also comprising an outer circumferential element for pressing said layers (12b) which are to form the tyre anchoring wings over said one or more cores.

27. Method according to claim 1, wherein said structural fibres are selected among: carbon fibres, glass fibres, aramidic fibres, boron fibres, ceramic fibres, or any combinations thereof.

28. Method according to claim 1, wherein said tyre anchoring wings are firstly made during said moulding process with a longer length than required and that after opening the mould said wings are reduced to the required length and/or shape by a machining operation.

29. Method according to claim 1, wherein first additional layers (C) are applied to increase the thickness of the outer wall and/or of the two wings of the rim.

30. Method according to claim 29, wherein second additional layers (D) are applied to fill the side regions of the outer wall of the rim from which said wings depart.

31. Method according to clam 1, wherein said mould and said cores are arrayed to define a rim with a symmetrical cross-section.

32. Method according to claim 1, wherein said mould and said cores are arranged to define a rim with an asymmetrical cross-section.

33. Method for producing a bicycle wheel rim of the type presenting an inner peripheral wall, an outer peripheral wall, two lateral walls joining said peripheral walls, and two circumferential wings, for anchoring a tyre, which extend outwards from the two sides of the outer peripheral wall, wherein said method comprises the following steps:

a. applying on an inner part of a mould a predetermined number of layers of structural fibre fabric incorporated in a plastic material matrix sufficient to form an inner wall, an outer wall, two lateral walls and wings;

b. arranging an inflatable bag on the layers between the lateral walls;

c. folding a first selected number of the predetermined layers on the inflatable bag, leaving the remaining predetermined number of layers free;

d. applying a core over the folded layers;

e. folding the remaining predetermined number of the layers over the core;

f. applying an outer part of the mould to enclose the layers;

g. pressing the layers against the mould with the inflatable bag and the core;

h. increasing the temperature of the mould to a value sufficient to cause reticulation of the plastic material matrix; and i. removing the core from the product of step i, to obtain a bicycle wheel rim formed of a single piece of structural fibre material.

34. Method for producing a bicycle wheel rim of the type presenting an inner peripheral wall, an outer peripheral wall, two lateral walls joining said peripheral walls, and two circumferential wings, for anchoring a tyre, which extend outwards from the two sides of the outer peripheral wall, wherein said method comprises the following steps:

a. providing a mould having an inner part and an outer part;

b. applying on the inner part of a mould a predetermined number of layers of structural fibre fabric incorporated in a plastic material matrix sufficient to form an inner wall, an outer wall, two lateral walls and wings;

c. arranging an inflatable bag on the layers between the lateral walls;

d. folding a first selected number of the predetermined layers on the inflatable bag, leaving the remaining predetermined number of layers free;

e. applying a single ring-shaped core of deformable dilating material over the folded layers;

f. folding the remaining predetermined number of the layers over the core;

g. applying the outer part of the mould to enclose the layers;

h. inflating the inflatable bag to press the layers against the mould;

i. increasing the temperature of the mould to a value sufficient to cause reticulation of the plastic material matrix;

j. removing the core from the product of step i, to obtain a bicycle wheel rim formed of a single piece of structural fibre material.

35. Method for producing a bicycle wheel rim of the type presenting an inner peripheral wall, an outer peripheral wall, two lateral walls joining said peripheral walls, and two circumferential wings, for anchoring a tyre, which extend outwards from the two sides of the outer peripheral wall, wherein said method comprises the following steps:

a. providing a mould having an inner part and an outer part with a centering projection on the outer part;

b. applying on the inner part of the mould a predetermined number of layers of structural fibre fabric incorporated in a plastic material matrix sufficient to form an inner wall, an outer wall, two lateral walls and wings;

c. arranging an inflatable bag on the layers between the lateral walls;

d. folding a first selected number of the predetermined layers on the inflatable bag, leaving the remaining predetermined number of layers free;

e. applying a core of a deformable dilating material with an outwardly facing recess for engagement of the centering projection of the outer portion of the mould over the folded first predetermined number of layers;

f. folding the remaining predetermined number of the layers over the core;

g. applying an outer part of the mould to enclose the layers;

h. inflating the inflatable bag to press the layers against the mould;

i. increasing the temperature of the mould to a value sufficient to cause reticulation of the plastic material matrix;

j. removing the core from the product of step i, to obtain a bicycle wheel rim formed of a single piece of structural fibre material.

36. Method for producing a bicycle wheel rim of the type presenting an inner peripheral wall, an outer peripheral wall, two lateral walls joining said peripheral walls, and two circumferential wings, for anchoring a tyre, which extend outwards from the two sides of the outer peripheral wall, wherein said method comprises the following steps:

a. providing a mould having an inner part and an outer part;

b. applying on the inner part of the mould a predetermined number of layers of structural fibre fabric incorporated in a plastic material matrix sufficient to form an inner wall, an outer wall, two lateral walls and wings;

c. arranging an inflatable bag on the layers between the lateral walls;

d. folding a first selected number of the predetermined layers on the inflatable bag, leaving the remaining predetermined number of layers free;

e. applying a core over the folded layers;

f. folding the remaining predetermined number of the layers over the core;

g. applying the outer part of the mould to enclose the layers;

h. inflating the inflatable bag to press the layers against the mould;

i. increasing the temperature of the mould to a value sufficient to cause reticulation of the plastic material matrix;

j. removing the core from the product of step i, to obtain a bicycle wheel rim formed of a single piece of structural fibre material, and wherein said structural fibres are; carbon fibres, glass fibres, aramidic fibres, boron fibres, ceramic fibres, or any combinations thereof.

37. Method for producing a bicycle wheel rim of the type presenting an inner peripheral wall, an outer peripheral wall, two lateral walls joining said peripheral walls, and two circumferential wings, for anchoring a tyre, which extend outwards from the two sides of the outer peripheral wall, wherein said method comprises the following steps:

a. providing a mould having an inner part and an outer part;

b. applying on the inner part of a mould a predetermined number of layers of structural fibre fabric incorporated in a plastic material matrix sufficient to form an inner wall, an outer wall, two lateral walls and wings;

c. arranging an inflatable bag on the layers between the lateral walls;

d. folding a first selected number of the predetermined layers on the inflatable bag, leaving the remaining predetermined number of layers free;

e. applying a core over the layers;

f. folding the remaining predetermined number of the layers over the core;

g. applying the outer part of the mould so as to enclose the layers;

h. inflating the inflatable bag to press the layers against the mould;

i. increasing the temperature of the mould to a value sufficient to cause reticulation of the plastic material matrix;

j. removing the core from thee product of step i, to obtain a bicycle wheel rim formed of a single piece of structural fibre material, and wherein said tyre anchoring wings are firstly made during said moulding process with a longer length than required and that after opening the mould said wings are reduced to the required length and/or shape by a machining operation.

38. The method of claim 35 wherein the core is comprised of a single ring-shaped member.

39. The method of claim 35 wherein the core is comprised of a multi-part, ring-shaped member.

40. A bicycle wheel rim produced by the process of:

a. applying on an inner part of a mould a predetermined number of layers of structural fibre fabric incorporated in a plastic material matrix sufficient to form an inner wall, an outer wall, two lateral walls and wings;

b. arranging an inflatable bag on the layers between the lateral walls;

c. folding a first selected number of the predetermined layers on the inflatable bag, leaving the remaining predetermined number of layers free;

d. applying a core over the folded layers;

e. folding the remaining predetermined number of the layers over the core;

f. applying an outer part of the mould to enclose the layers;

g. inflating the inflatable bag to press the layers against the mould;

h. increasing the temperature of the mould to a value sufficient to cause reticulation of the plastic material matrix; and i. removing the core from the product of step h, to obtain a bicycle wheel rim formed of a single piece of structural fibre material.

41. The rim of claim 40 wherein the process further comprises the core being a single ring-shaped member.

42. The rim of claim 40 wherein the process further comprises the core being a multi-part, zing-shaped member.

43. A method for producing a bicycle wheel rim of the type presenting an inner peripheral wall, an outer peripheral wall, two lateral walls joining said peripheral walls, and two circumferential wings, for anchoring a tyre, which extend outwards from the two sides of the outer peripheral wall, wherein said method comprises the following steps:

a. applying on an inner part of a mould a predetermined number of layers of structural fibre fabric incorporated in a thermally activated material sufficient to form an inner wall, an outer wall, two lateral walls and wings;

b. arranging an inflatable bag on the layers between the lateral walls;

c. folding a first selected number of the predetermined layers on the inflatable bag, leaving the remaining predetermined number of layers free;

d. applying a core over the folded layers;

e. folding the remaining predetermined number of the layers over the core;

f. applying an outer part of the mould to enclose the layers;

g. inflating the inflatable bag to press the layers against the mould;

h. increasing the temperature of the mould to a value sufficient to activate the thermally activated material; and i. removing the core from the product of step h, to obtain a bicycle wheel rim formed of a single piece of structural fibre material.

44. Method according to claim 43, wherein said core also applies pressure to said layers.

45. Method according to claim 43, wherein the increase of temperature and application of pressure to the layers occur substantially simultaneously.

46. Method according to claim 43, wherein a cooling phase is provided before removal of the rim from the mould.

47. Method according to claim 43, wherein said core is made of a material with a thermal dilation coefficient exceeding $5 \times 10$ mm/° C., the moulding process comprising an increase in temperature to a value sufficient to cause the material of said core to dilate so to press the layers of fabric forming the tyre anchoring wings against the wall of the mould.

48. Method according to claim 47, wherein the material forming the core has a thermal dilation coefficient exceeding $9 \times 10$ mm/0C.

49. Method according to claim 48, wherein the material forming the core is either PTFE, or PCTFE, or PVDF, or FE-HD.

50. Method according to claim 48, wherein the material forming the core is PTFE.

51. Method according to claim 43, wherein said structural fibres are carbon fibres.

52. Method according to claim 43, wherein said thermally activated material is a thermosetting plastic material matrix.

53. Method according to claim 43, wherein said temperature is comprised in the range from 80° C. to 200° C.

54. Method according to claim 53, wherein said temperature is maintained for 10 minutes to 3 hours.

55. Method according to claim 54, wherein said temperature is maintained for 30 minutes to 3 hours.

56. Method according to claim 53, wherein the core comprises two ring-shaped cores, which are arranged so as to be spaced from each other.

57. Method according to claim 56, wherein each ring-shaped core is made in a single piece of deformable material.

58. Method according to claim 56, wherein each ring-shaped core is split into several sectors.

59. Method according to claim 56, wherein the space between said ring-shaped cores is filled by a circumferential rib belonging to the mould.

60. Method according to claim 56, wherein a third ring-shaped core, also made of thermally dilating material, is arranged between said two rings.

61. Method according to claim 60, wherein said third ring-shaped core is made in a single piece of deformable material.

62. Method according to claim 60, wherein said third ring-shaped core is split into several sectors.

63. Method according to claim 43, wherein the core is made by a single ring-shaped member of deformable dilating material.

64. Method according to claim 63, wherein the core is made of a silicone sheath.

65. Method according to claim 64, wherein the silicone sheath is divided in sectors.

66. Method according to claim 65, wherein the single ring-shaped core has an outwardly facing recess for engagement of a centering projection of the mould.

67. Method according to claim 66, wherein the centering projection is provided on an outer portion of the mould.

68. Method according to claim 43 wherein the mould comprises two inner circumferential elements arranged side by side, on which the layers for forming the inner peripheral wall and the two lateral walls of the rim are deposited, said mould also comprising an outer circumferential element for pressing said layers which are to form the tyre anchoring wings over said one or more cores.

69. Method according to claim 43, wherein said structural fibres are selected among: carbon fibres, glass fibres, aramidic fibres, boron fibres, ceramic fibres, or any combinations thereof.

70. Method according to claim 43, wherein said tyre anchoring wings are firstly made during said moulding process with a longer length than required and that after opening the mould said wings are reduced to the required length and/or shape by a machining operation.

71. Method according to claim 43, wherein first additional layers (C) are applied to increase the thickness of the outer wall and/or of the two wings of the rim.

72. Method according to claim 71, wherein second additional layers (D) are applied to fill the side regions of the outer wall of the rim from which said wings depart.

73. Method according to claim 43, wherein said mould and said cores are arranged to define a rim with a symmetrical cross-section.

74. Method according to claim 43, wherein said mould and said cores are arranged to define a rim with an asymmetrical cross-section.

* * * * *

UNITED STATES PATENT AND TRADEMARK OFFICE
CERTIFICATE OF CORRECTION

PATENT NO. : 6,761,847 B2
DATED : July 13, 2004
INVENTOR(S) : Mario Meggiolan

It is certified that error appears in the above-identified patent and that said Letters Patent is hereby corrected as shown below:

<u>Title page,</u>
Item [57], ABSTRACT,
Line 4, after the first instance of the word "a", delete "tire" and insert therefor -- tyre --.
Line 5, after the word "structural", delete "fiber" and insert therefor -- fibre --.
Line 6, after the word "carbon", delete "fiber" and insert therefor -- fibre --.

<u>Column 2,</u>
Line 2, after the word "$5 \times 10^{-5} mm/°C$" delete ".".
Line 8, after the word "$9 \times 10^{-5} mm/°C$" delete ".".
Line 20, after the word "$260°C$" delete ".".
Line 20, after the word "$0.25 \ W/m°C$" delete ".".

<u>Column 4,</u>
Line 47, after the word "$80°C$ " delete ".".

<u>Column 5,</u>
Line 45, after the word "bag," delete "leasing" and insert therefor -- leaving --.

<u>Column 6,</u>
Line 5, delete "$5 \times 10 mm/°C.$" and insert therefor -- $5 \times 10^{-5} mm/°C$ --.
Line 9, delete "$9 \times 10 mm/0C$" and insert therefor -- $9 \times 10^{-5} mm/°C$ --.
Line 20, after the word "$80°C$" delete ".".

<u>Column 7,</u>
Line 13, after the word "are", delete "arrayed" and insert therefor -- arranged --.
Line 45, after the word "step", delete "i" and insert therefor -- h --.

<u>Column 9,</u>
Line 46, after the word "from", delete "thee" and insert therefor -- the --.

<u>Column 10,</u>
Line 18, after the word "multi-part,", delete "zing-shaped" and insert therefor -- ring-shaped --.
Line 57, after the word "exceeding", delete "$5 \times 10 mm/°C.$" and insert therefor -- $5 \times 10^{-5} mm/°C$ --
Line 64, delete "$9 \times 10 mm/0C$" and insert therefor -- $9 \times 10^{-5} mm/°C$ --.
Line 67, delete "FE-HD" and insert therefor -- PE-HD --.

UNITED STATES PATENT AND TRADEMARK OFFICE
CERTIFICATE OF CORRECTION

PATENT NO. : 6,761,847 B2
DATED : July 13, 2004
INVENTOR(S) : Mario Meggiolan

It is certified that error appears in the above-identified patent and that said Letters Patent is hereby corrected as shown below:

Column 11,
Line 8, after the word "80°C" delete "."

Signed and Sealed this

Twenty-first Day of December, 2004

JON W. DUDAS
*Director of the United States Patent and Trademark Office*